June 2, 1931.  F. McLAUGHLIN  1,808,565
FISHING LURE
Filed April 11, 1929  3 Sheets-Sheet 1

Inventor
F. McLaughlin
by J. Edw. Maybee
ATTY.

June 2, 1931. F. McLAUGHLIN 1,808,565
FISHING LURE
Filed April 11, 1929 3 Sheets-Sheet 2

Inventor
F. McLaughlin.
by J. Edw. Maybee
ATTY.

June 2, 1931.　　　F. McLAUGHLIN　　　1,808,565
FISHING LURE
Filed April 11, 1929　　　3 Sheets-Sheet 3

Inventor
F. McLaughlin
by J. Edw. Maybee
ATTY.

Patented June 2, 1931

1,808,565

UNITED STATES PATENT OFFICE

FRANK McLAUGHLIN, OF TORONTO, ONTARIO, CANADA, ASSIGNOR, BY MESNE ASSIGNMENTS, TO WILLIAM CRAWFORD GOFFATT, OF TORONTO, ONTARIO, CANADA

FISHING LURE

Application filed April 11, 1929. Serial No. 354,235.

This invention relates to artificial baits or lures used in fishing, and particularly of the type shown in my copending application No. 237,938, filed Nov. 28, 1927, in which the hook has its shank arranged longitudinally relative to the body, the barb of the hook being normally shielded in a recess at the rear end of the body, means being provided for causing a rotary movement of the shank to move the barb to an unshielded position upon the release of said barbed end from the recess.

Figure 1:
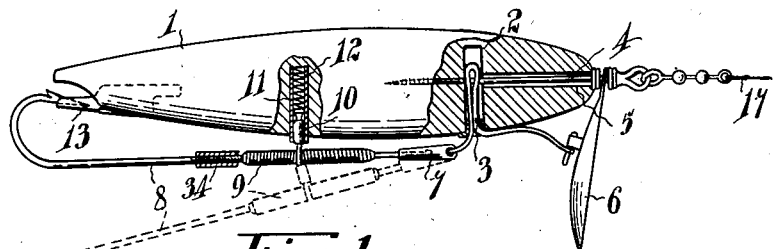
Figure 2:
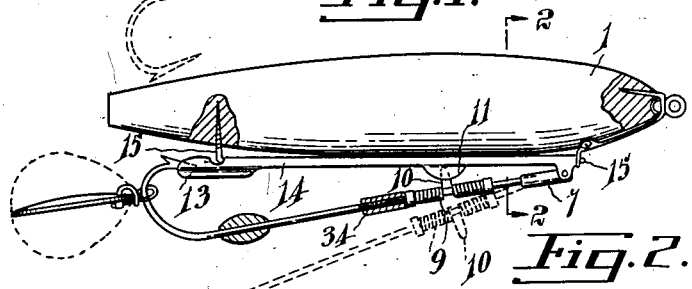
Figure 3:
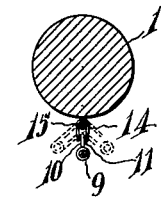
Figure 4:
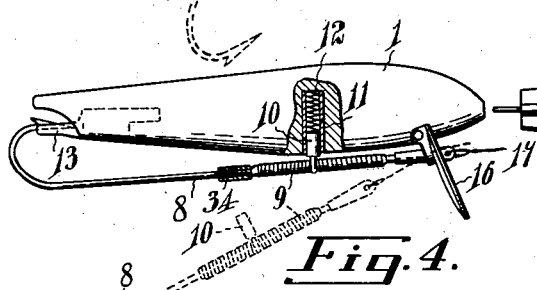
Figure 5:
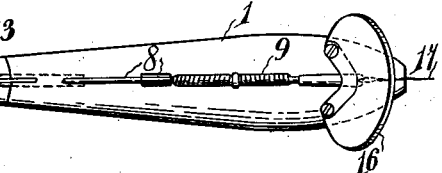
Figure 6:
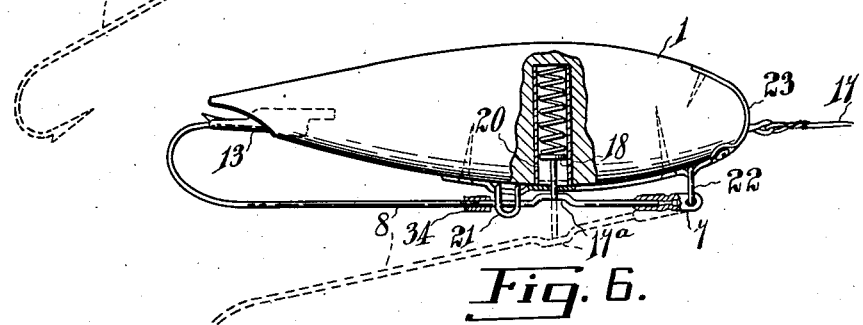
Figure 7:
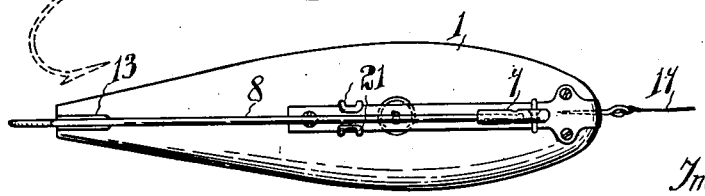
Figure 10:
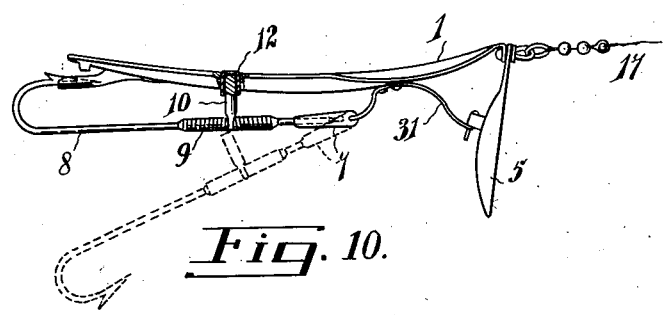
Figure 11:
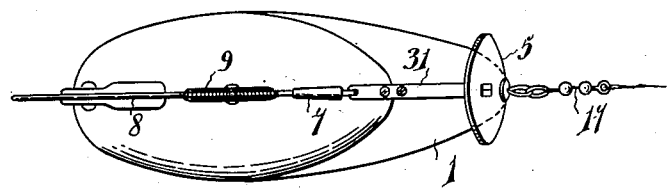
Figure 8:
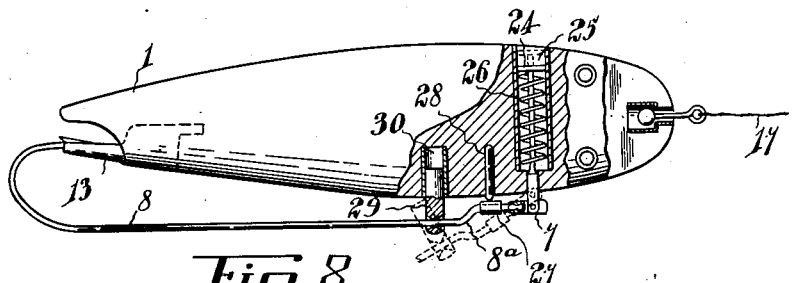
Figure 9:
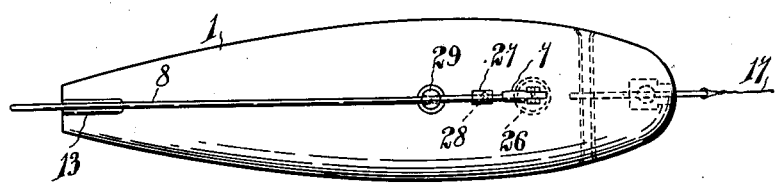
Figure 12:
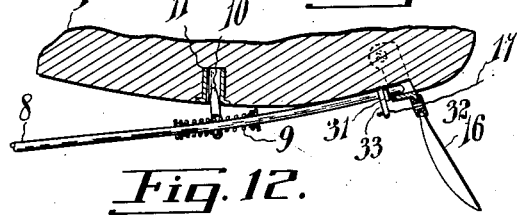
Figures 13, 14:
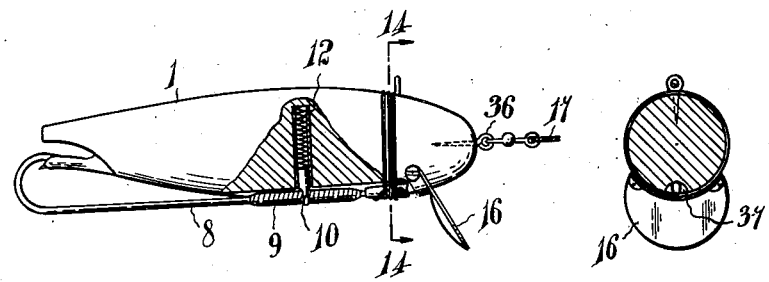
Figures 15, 16:
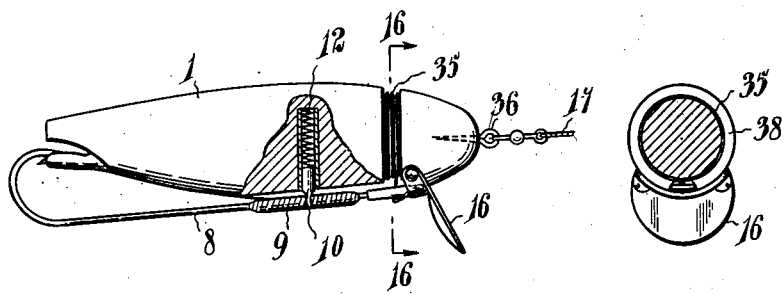

It is my object in the present invention to devise certain improvements in connection with a bait of this type whereby certain advantages are obtained. My improved constructions are hereinafter more specifically described and illustrated in the accompanying drawings in which Fig. 1 is a side elevation, partly broken away, illustrating one form of my invention;

Fig. 2 a side elevation, partly broken away, of a modified construction;

Fig. 3 a section taken on the line 2—2 in Fig. 2;

Fig. 4 a side elevation of another modified form, partly broken away;

Fig. 5 a plan view of the underside of the same;

Fig. 6 a side elevation, partly broken away of another modification;

Fig. 7 a plan view of the underside of the same;

Fig. 8 a side elevation, partly broken away of still another modification;

Fig. 9 a plan view of the underside of the same;

Fig. 10 a side view showing one form of my invention applied to a body of the spoon type;

Fig. 11 a plan view of the same;

Fig. 12 a sectional detail showing a further modification of the invention;

Fig. 13 a side elevation partly broken away of still another form of my invention;

Fig. 14 a cross section through the same;

Fig. 15 a side elevation partly broken away, of a modification of the construction shown in Fig. 13;

Fig. 16 a cross section through the same; and

Figure 17:
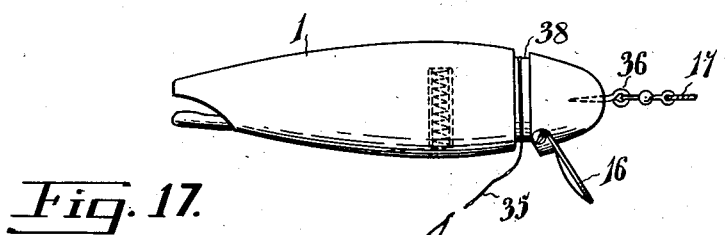

Fig. 17 a side elevation of the bait shown in Fig. 15, showing the hook released.

In the drawings like numerals of reference indicate corresponding parts in the different figures.

Referring to Fig. 1, 1 is the body, which may be of wood, metal or other material and given any desired finish. The body has a hole 2 formed transversely thereof into which extends a wire loop 3, the loop being held in place by means of a pin 4 extending through a longitudinal hole 5 communicating with the hole 2, the end of the pin 4 being threaded and screwed into the body. This pin 4 is preferably provided with an eye to which a line may be attached. One end of this loop 3 is extended forwardly and helps to support a wobbler 6, the wobbler in this case also being partly supported by the pin 4.

While the lure shown in Figs. 4 and 5 permits the recovery of the body in the event of a breakage of the line, this recovery is often difficult if the fisherman is fishing from the shore, and a boat is not readily available. I have therefore devised the lures shown in Figs. 13 and 17 with a view to recovering the body in the event of the fish breaking away with the hook. I therefore connect the hook to a short line 35, which line will be normally wound about the body with its end secured thereto. The main line or gimp 17 is connected to an eye 36 secured to the head of the body. In the form shown in Figs. 15, 16 and 17, a groove 38 is provided to receive the turns of the line 35, while the shank of the hook is received in a notch in the underside of the body where it is held by the flange on the diving device as shown in Fig. 15.

In Figs. 13 and 14, the body is provided with a notch 37 in its underside across which extend the turns of the line 35, and the shank of the hook is held in said notch by the line 35.

The main line 17 will be of stronger material than the line 35, hence if the line 35 breaks, the body of the lure may be recovered by drawing in on the main line.

To the other end of the loop 3 is connected a socket 7 in which is rotatably received the end of the shank 8 of the hook. Mounted on the shank of the hook is a coil spring 9 provided with a stem 10 adapted to engage in a recess 11 in the body. A coil spring 12 in this recess normally tends to expel the stem from the recess. By positioning the stem 10 in the recess 11 and rotating the hook, the spring 9 may be put under tension tending to rotate the hook in the reverse direction. To prevent rotation of the hook to hold the spring under tension, the barbed end of the hook is engaged in a notch in the tail end of the body. This notch is preferably provided by cutting away the underside of the tail end of the body and fitting in a metal piece 13 as indicated.

With the arrangement described, the fish in biting moves the body and hook shank closer together to disengage the barbed end from the recess. The spring 9 then comes into action to rotate the shank, while the hook either by gravity or with the assistance of the spring 12 will swing away from the body as indicated in dotted lines.

The construction shown in Figs. 2 and 3 differs from that shown in Fig. 1 in that the hook is mounted on a frame 14 pivoted on the body. This frame may swing from side to side relative to the body as indicated in dotted lines in Fig. 3. The frame 14 consists of a tube opened up at one end to provide lugs between which the socket 7 may be pivoted and opened up also at the other end to form the recess 13 in which the barbed end of the hook is engaged and also to receive the end of the supporting pin 15. The stem 10 in this case is formed as a simple wire loop connecting the parts of the spring 9 and the recess 11 in which the stem engages is formed by the space between two wings or lugs on the tube.

The operation, with the exception that the hook may swing relative to the body, is precisely the same as the construction of Fig. 1.

In Figs. 4 and 5 the hook instead of being secured to the frame 14 as in Fig. 2 or the loop 3 as in Fig. 1, is substantially free of the body, the end of the shank being slipped through a recess provided between the body 1 and a diving device 16. This recess is so shaped that the hook may swing to a position such as shown in dotted lines in Fig. 4. In this case the line 17 is directly secured to an eye provided at the end of the shank of the hook. With this arrangement the hook upon release first rotates to expose the point, then the hook end swings away from the body and finally the hook pulls away from the body as indicated in dotted lines in Fig. 4. With this arrangement, if the body be made of buoyant material and the line breaks, the body will float to the surface of the water where it may be recovered for use again with a fresh hook.

In Figs. 6 and 7 the socket 7 is hingedly mounted on the body and the shank 8 has its head rotatably mounted in said socket. The body at its tail end is provided with the same recess 13 in which the barbed end is engaged to hold the hook from rotation. A different method, however, is employed in causing the rotation of the hook. In this case the shank is provided with an offset or eccentric portion 17$^a$ against which is adapted to bear a spring pressed plunger 18 projecting from a recess 20 formed in the body. The holding of the hook in position is assisted by a pair of stops 21. The retaining means for the line 22 to which the socket 7 is connected, the stops 21 and the stop for the plunger 18 are all formed as part of a metal strip 23 extending longitudinally of the body, which strip is held in place by small tacks or screws.

In Figs. 8 and 9 is shown a modification of the idea employed in Figs. 6 and 7. The socket 7, in which the head of the hook shank is rotably mounted, is pivotally connected with a plunger 24 extending into a recess 25 in the body where a spring 26 normally tends to hold it in retracted position. The portion 8$^a$ of the shank adjacent to the head is offset or eccentric relative to the main part of the shank and has a roller 27 mounted thereon adapted to rest on a post 28 extending from the body. To position the hook, a stem 29 is fitted on the hook and is adapted to extend into a recess 30 in the body.

With this arrangement, when the barbed end of the hook is disengaged from the recess through the tension of the spring 26 and the action of the offset part 8$^a$ bearing on the post 28, the hook is rotated to move the barbed end to catching position.

In Figs. 10 and 11 is shown a construction similar to that shown in Fig. 1, the body, however, being in the form of a metal "spoon" instead of a "plug". The support for the pivoted end of the hook is formed as a metal strip 31 riveted intermediate its ends to the spoon, one end having the socket 7 secured thereto and the other end supporting the wobbler 5. The recess with which the barbed end of the hook engages is formed by stamping up a piece of the body of the spoon or securing a piece thereto.

The spring 9 is preferably arranged so that the hook may be rotated in either direction to put it under tension.

In Fig. 12 is shown operating similar to that shown in Figs. 4 and 5, the line 17 passing through an eyelet 32 in the diving device 16 and connected to a collar 33 rotatably mounted on the hook shank. A shoulder 34 is provided on the hook shank to retain the collar in place. In this case the end of the shank is received in a notch in the underside of the body, the flange on the diving device serving to hold the shank in the notch.

While the lure shown in Figs. 4 and 5 permits the recovery of the body in the event of a breakage of the line, this recovery is often difficult if the fisherman is fishing from the shore, and a boat is not readily available. I have therefore devised the lures shown in Figs. 13 and 17 with a view to recovering the body in the event of the fish breaking away with the hook. I therefore connect the hook to a short line 35, which line will be normally wound about the body with its end secured thereto. The main line or gimp 17 is connected to an eye 36 secured to the head of the body. In the form shown in Figs. 15, 16 and 17, a groove 38 is provided to receive the turns of the line 35, while the shank of the hook is received in a notch in the underside of the body where it is held by the flange on the diving device as shown in Fig. 15.

In Figs. 13 and 14, the body is provided with a notch 37 in its underside across which extend the turns of the line 35, and the shank of the hook is held in said notch by the line 35.

The main line 17 will be of stronger material than the line 35, hence if the line 35 breaks, the body of the lure may be recovered by drawing in on the main line.

While in a number of the forms shown, the hook may be readily replaced in case of damage or difficulty in removing it from a fish, I may, however, form the shank in two parts, connected together by a sleeve 34, the hook end being, for example, threaded into the sleeve to facilitate removal and replacement.

What I claim as my invention is:

1. In a fishing bait, the combination of a body; a hook having its shank swingably and rotatably mounted relative to the body whereby on the hook rotating about the axis of its shank the point of the hook may occupy a position shielded by the body or a position spaced from the body; and means for normally retaining the hook with its point in the shielded position, the hook and body being relatively displaceable to release the hook for rotation.

2. In a fishing bait, the combination of a body; a hook having its shank swingably and rotatably mounted relative to the body whereby on the hook rotating about the axis of its shank the point of the hook may occupy a position shielded by the body or a position spaced from the body; and means for normally retaining the hook with its point in the shielded position, the hook and body being relatively displaceable to release the hook for rotation, said hook being free to pull away from the body after it moves from its shielded position.

3. In a fishing bait, the combination of a body; a hook having the end of its shank swingably mounted on the body, at least the main part of the shank being rotatable; a coil spring on said shank; a stem on said spring engageable with the body to tension the spring through rotation of the shank; and means carried by the body with which the point of the hook may be releasably engaged to hold the hook with said spring under tension.

4. In a fishing bait, the combination of a body; a hook having the end of its shank swingably mounted on the body, at least the main part of the shank being rotatable; a coil spring on said shank; a stem on said spring engageable with the body to tension the spring through rotation of the shank, said body having a recess therein to receive the stem; a spring in said recess tending to expel the stem from the recess; and means carried by the body with which the point of the hook may be releasably engaged to hold the hook with said spring under tension.

5. In a fishing bait, the combination of a body; a direction-influencing device mounted on said body, an opening being provided between the body and direction-influencing device; a hook having its shank extending through said opening in which it is free to rotate, said opening being sufficiently large to permit a limited swinging movement of the shank; spring means carried by the shank and engageable with the body whereby said spring means may be put under tension through the rotation of the hook; and means carried by the body with which the point of the hook may be releasably engaged to hold the hook with the spring under tension.

6. In a fishing bait, the combination of a body; a hook having its shank swingably and rotatably mounted relative to the body whereby on the hook rotating about the axis of its shank the point of the hook may occupy a position shielded by the body or a position spaced from the body; means for normally engaging the hook to position it with its point in the shielded position, the hook and body being relatively displaceable to release the hook for rotation; and a short line connecting the shank of the hook with said body.

7. In a fishing bait, the combination of a body; a hook having its shank swingably and rotatably mounted relative to the body whereby on the hook rotating about the axis of its shank the point of the hook may occupy a position shielded by the body or a position spaced from the body; means for normally engaging the hook to position it with its point in the shielded position, the hook and body being relatively displaceable to release the hook for rotation; and a short line connecting the shank of the hook with said body, a main line connected with the body, said short line being weaker than the main line.

8. In a fishing bait, the combination of a body; a hook having its shank swingably and rotatably mounted relative to the body whereby on the hook rotating about the axis of its shank the point of the hook may occupy a position shielded by the body or a position spaced from the body; means for normally engaging the hook to position it with its point in the shielded position, the hook and body being relatively displaceable to release the hook for rotation; and a short line connecting the shank of the hook with said body, the body having an annular groove formed therein in which the short line may be wound.

Signed at Toronto, Canada, this 19th day of March, 1929.

FRANK McLAUGHLIN.